June 11, 1957  G. V. CLARK  2,795,086
EDGE FINISHING METHOD AND APPARATUS
Filed Nov. 21, 1952  2 Sheets-Sheet 1

Inventor
George Vincent Clark
By Nobbe & Swope
Attorneys

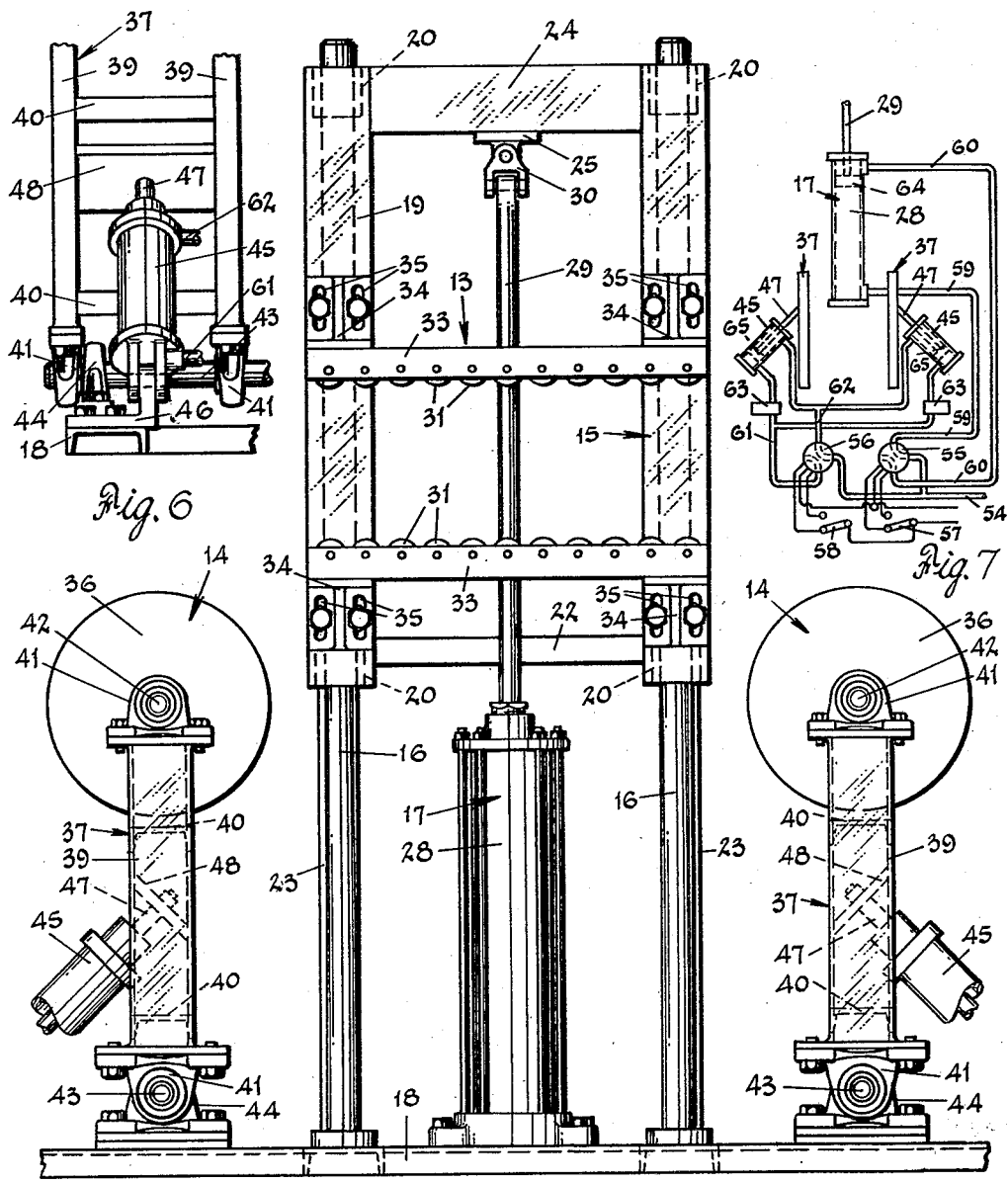

2,795,086
Patented June 11, 1957

2,795,086

EDGE FINISHING METHOD AND APPARATUS

George Vincent Clark, Ottawa, Ill., assignor to Libbey-Owens-Ford Glass Company, Toledo, Ohio, a corporation of Ohio Application November 21, 1952, Serial No. 321,734

2 Claims. (Cl. 51—84)

This invention relates to the edge finishing of pattern cut glass sheets or the like. More particularly, it relates to a method and apparatus for simultaneously finishing opposite edges of said sheets as they are moved in a predetermined path.

In the production of automobile windows, individual sheets of the desired outline are pattern cut from glass blanks and matched pairs of these sheets are laminated together with an inner layer of plastic material to form safety glass. The edges of the sheets of safety glass are square and sharp and the inner layer of plastic material has been caused to expand during the lamination process, resulting in a fringe or margin of the plastic projecting outwardly between the sheets.

During passage of the sheet of safety glass on suitable conveyor means, one or more of these sharp edges, usually the exposed edge or edges as mounted in an automobile, are given a "pencil finish" by a suitable edge grinding element, as well known in the art, and the fringe of plastic material is removed by a wire brush element. In this respect, all of the edges of the sheet of safety glass may be "wire brushed" or, if desired, only those edges which are not "pencil finished." In the latter case, the fringe of plastic is removed during the edge grinding operation aforenoted. In any case, the edges of the sheet of safety glass are finished in such a manner as to prepare them for mounting in an automobile frame.

It is an object of this invention to provide an improved method and apparatus for finishing the edges of a sheet of safety glass or the like.

Another object of this invention is to provide an improved method and apparatus of the type described which will permit great savings in time and expense to be made in the production of automobile window glass.

Still another object of this invention is to provide an improved method and apparatus of the type described in which opposite edges of said sheet may be finished simultaneously.

Still another object of this invention is to provide a method and apparatus of the type described by means of which finishing elements are disposed in the path of the edges to be treated and caused to be held thereagainst during the passage of said edges therepast.

Still another object of this invention is to provide a method and apparatus of the type described by means of which finishing elements are caused to be held against opposite edges to be treated in such a manner as to maintain the sheet of safety glass in proper position as said opposite edges are moved therepast and simultaneously finished.

Other objects and advantages of the invention will become more apparent during the course of the following description when taken in connection with the accompanying drawings.

In the drawings, wherein like numerals are employed to designate like parts throughout the same:

Fig. 5 is an enlarged front elevation of a part of the apparatus, with the sheet removed;

Fig. 6 is a detailed side view of a power unit for one of the finishing elements of the apparatus; and Fig. 7 is a schematic diagram of the connections for coordinating the operation of the power units for the finishing elements and sheet supporting carriage.

Figure 1:
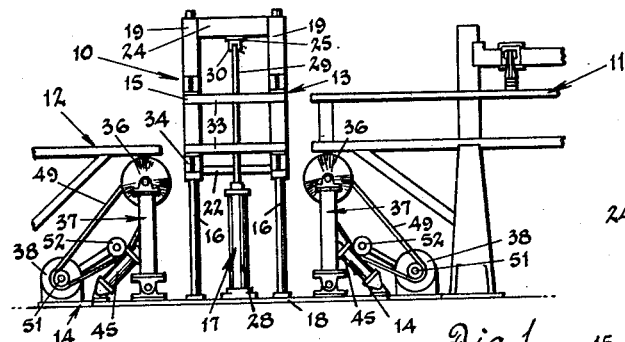
Fig. 1 is a front elevation of the overall edge finishing apparatus constructed in accordance with this invention.

According to this invention, a sheet of pattern cut glass or the like, or sheets of the same in a safety glass "sandwich," having substantially parallel opposite sides or edges is caused to be passed between finishing elements to simultaneously treat both of said edges in the manner desired. In particular, the sheet or sheets are supported on a movable carriage from which said edges project and which carries said sheets in a predetermined path. Finishing elements are supported outwardly and at both sides of the carriage so as to be swingable into the path of the edges of the sheets as they are moved on the carriage past said elements. Power units are provided for each of the finishing elements such that they may be urged into yielding contact with the opposite edges and hold the same in properly disposed position as said edges are treated simultaneously.

While the method and apparatus of this invention for finishing sheet edges has been found particularly well suited to the "wire brushing" operation afore-noted and the specific embodiment in the drawings is so shown, it is not necessarily restricted thereto. That is, it is contemplated that other smoothing and/or grinding operations may be performed by this apparatus, as will be more fully explained hereinafter.

Referring now to the drawings, there is shown in Fig. 1 the overall apparatus of this invention, designated in its entirety by the numeral 10, and including first and second conveyor means 11 and 12, respectively, carriage 13, and edge finishing means 14 disposed at each side thereof. The conveyors 11 and 12 may be of any suitable type by which the sheets may be carried forwardly (from right to left in Fig. 1) on edge from conveyor 11 to carriage 13 and away from said carriage on conveyor 12. Any suitable means may be provided for rendering said conveyors continuously or intermittently movable whereby the sheets supported thereon may be carried on conveyor 11 to a position adjacent the carriage 13 and manually lifted therefrom onto said carriage and, subsequently, manually lifted from the carriage to a position on the conveyor 12 adjacent said carriage from where said sheets may be carried away.

The carriage 13 comprises a frame 15 which is slidably mounted on upstanding posts 16 and means 17 for moving said frame vertically on said posts. Posts 16, moving means 17, as well as finishing means 14 are anchored to a solid foundation 18 over which the conveyors 11 and 12 are mounted. The frame 15 includes spaced upright channels 19 having sleeve members 20 secured to the upper and lower ends thereof, which sleeves are adapted to slide over posts 16. The posts 16 are extended through horizontally disposed plates 21 that are located above the lower sleeve members or bearings 20 and are supported at their opposite ends by a cross-member 22 extended therebetween. A brace 23 extends diagonally downward from each end of the cross-member 22 to the foundation 18 lending additional stability to the mounting for the posts 16.

Extending between the upper ends of uprights 19 is an upper cross-member 24 to the underside of the center of which is secured a plate 25. Mounted on the outer end of the plate 25 is an additional cross-member 26. End plates 27 are secured to and extend between uprights 19 and the additional cross-member 26 to brace the upper end of frame 15. Carriage moving means 17 includes an air cylinder 28 and piston rod 29, the upper end of which is connected by a swivel joint 30 to the underside of plate 25. Thus, vertical movement may be imparted to the frame 15 by said cylinder through rod 29, in a manner to be more particularly described hereinafter.

The sheets are mounted at their edges in an upright position on the frame 15 by means of a series of horizontally disposed rollers 31 having oppositely disposed grooves 32 for the reception of a plurality of sheets. Upper and lower sets of the rollers 31 are carried in properly spaced position by bars 33 mounted on brackets 34 secured to uprights 19. As shown, the brackets are bolted to said uprights through slots 35, permitting the effective space between said upper and lower sets of rollers to be adjusted for different sizes of sheets. Each of the upper and lower sets of rollers includes a plurality of individual rollers arranged in parallel relation, the grooves 32 being of a size to firmly but releasably engage the opposite edges of the sheets in a vertical on-edge position. Each of the rollers is rotatably mounted in the bars 33 to permit the sheets to be rolled therebetween from the side. It will be understood from Fig. 4 that a plurality of sheets may be so supported in vertically disposed, parallel relation.

Each of the finishing means 14 disposed at opposite sides of carriage 13 includes a finishing member or roller 36, swingably supported on an arm 37 and rotatably driven by a motor 38 (Fig. 1). Each of the arms 37 comprises spaced upright members 39, cross braces 40 extending therebetween, and bearings 41 secured to the upper and lower ends of said uprights.

Figure 4:
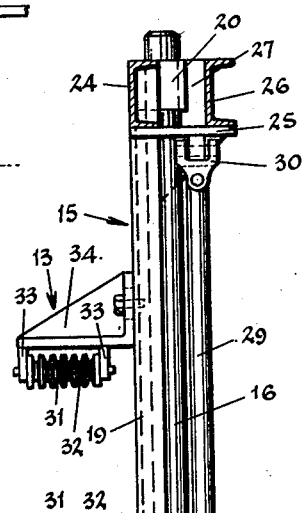
Fig. 4 is an enlarged vertical section of the apparatus, taken substantially along line 4—4 of Fig. 3.

Upper and lower shafts 42 and 43, respectively, are journaled in said bearings at opposite ends of each of the uprights 39, the lower shaft 43 being pivotally supported above the foundation 18 by pillow bearings 44 secured thereto, as best shown in Fig. 4, to permit the arms 37 to be swung in a vertical plane inwardly and outwardly of the carriage 13. This swinging movement is imparted to each of said arms, in a manner to be more particularly described hereinafter, by individual air cylinders 45 pivotally mounted by bracket 46 (Fig. 6) to the foundation 18. A piston rod 47 extends from each of said cylinders and is secured at its outer end to a diagonally disposed plate 48 mounted between uprights 39. As best shown in Fig. 5, each of the plates 48 is disposed substantially perpendicular to piston rod 47.

Each of the finishing rollers 36 is keyed to upper shaft 42 intermediate pillow bearings 41 and in vertical alignment with the rollers 31. As shown in the drawings, finishing roller 36 may be of cylindrical shape having individual wires projecting radially from the center thereof to form a brushing member. As well, of course, the roller 36 may be provided with a solid abrasive surface in which case it would be used for smoothing and/or grinding purposes.

Figure 3:
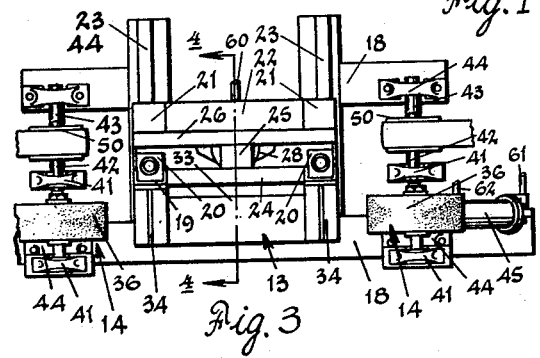
Fig. 3 is a top plan view of the apparatus shown in Fig. 2.

Each of the upper shafts 42 and finishing rollers 36 are rotated at any desired speed by individual motors 38 through belts 49 trained over a roller 50 (Fig. 3) keyed to the end of said shaft and driven from shaft 51 on said motor. Idler rollers 52 are swingably supported from the motor 38 for taking up the slack in belts 49.

Figure 2:
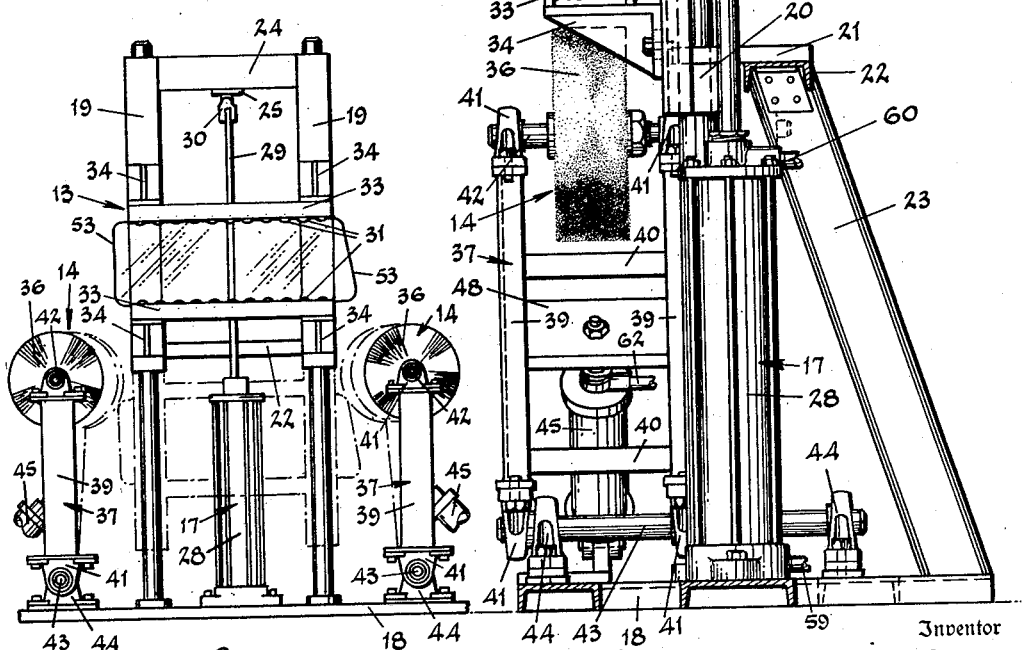
Fig. 2 is a front elevation of a part of the apparatus, showing a sheet of safety glass operatively mounted thereon.

In operation, the matched sheets to be edge finished are mounted on the frame 15 with one pair of opposite edges slidably engaged by the grooves 32 of rollers 31, as best shown by the solid lines of Fig. 2. The adjacent opposite edges 53 to be finished are aligned with one another such that they project outwardly from uprights 19 approximately an equal distance. Air cylinders 45 for the arms 37 are actuated to retract said arms and finishing rollers 36 to an upright, inactive position, shown by the solid lines in Fig. 2, and air cylinder 28 for the carriage 13 is actuated to lower said carriage and the sheets supported thereon to its lowermost position, as shown by the phantom lines of Fig. 2.

When the carriage has been so lowered, air cylinders 45 for the arms 37 are again actuated to cause said arms and the rotating finishing rollers 36 to simultaneously swing inwardly into contact with the upper end of the opposite edges 53 of the sheets to be finished, as shown by the innermost phantom lines of Fig. 2. In this connection, it will be understood that said edges need not necessarily be parallel but may be at slight angles to one another, such that sheets of trapezoidal as well as rectangular outline may be edge treated with equal facility by the apparatus of this invention. In order that the finishing rollers 36 be caused to bear firmly and resiliently against the edges 53 but not with such force as to injure the same, suitable relief means are provided in the actuating means for the air cylinders 45, in a manner to be described hereinafter.

When the finishing rollers 36 have been swung into contact with the opposite edges 53 of the sheets, the air cylinder 28 for the carriage 13 is again actuated to raise the same to cause said edges to move upwardly and past the finishing rollers. The inwardly urged rollers not only serve to finish the entire length of each of said edges but also maintain the sheets in proper position on the carriage by their equal resilient pressure on each of said opposite edges 53 during contact therewith. When the carriage has reached its uppermost position, shown by the solid lines of Fig. 2, each of the edges 53 has been finished in the desired manner. The sheets may be removed from their supported position on said carriage, and the air cylinders 45 actuated to return arms 37 and finishing rollers 36 to their upright, inactive position preparatory to another cycle as above described.

There is shown in Fig. 7 a schematic diagram of the coordinated actuating means for the air cylinders 28 and 45, by means of which the operations above described may be performed. Air pressure is supplied from any suitable source (not shown) through a line 54 to four-way valves 55 and 56 which are actuated by switches 57 and 58, respectively. From valve 55, line 59 leads to the lower end of air cylinder 28 and line 60 to the upper end thereof. From valve 56, line 61 branches to the lower ends of each of the air cylinders and line 62 branches to the upper ends thereof. Automatic relief valves 63 are provided on each branch of line 61.

With switch 57 in the downward position, as shown in Fig. 7, four-way valve 55 is rotated to the position shown in said figure to connect the pressure line 54 with line 59 leading to the lower end of the air cylinder 28. In this manner, piston 64 in said cylinder is raised and rod 29 lifts carriage 13 to its upper position. With switch 58 likewise in its downward position, four-way valve 56 connects pressure line 54 with line 62 branching to the upper ends of air cylinders 45. Thus, the piston 65 in each of said cylinders is lowered and rods 47 are retracted to swing arms 37 and finishing rollers 36 to their upright, inactive position.

At the start of a cycle, switch 57 is moved to its upward position, whereby valve 55 is caused to connect the air pressure line 54 with line 60 leading to the upper end of air cylinder 28. Piston 64 is thus forced downwardly and carriage 13 and the sheets supported thereon are lowered to the position shown by the phantom lines of Fig. 2. At this time, switch 58 is also moved to its upward position, whereby the valve 56 is caused to connect said air pressure line with the branches of line 61 which lead to the lower end of the air cylinders 45. Thus, pistons 65 in each of said cylinders are forced upwardly and the arms 37 and finishing rollers 36 supported thereon are swung into engaging position with the sheet edges 52. By means of suitable relief valves 63, the finishing rollers are maintained resiliently in their engaging position with the edges 52.

Switch 57 may at this time be moved back to its downward position as shown in Fig. 7, causing the carriage 13 to be raised to its upper position, in the manner previously described. The opposite edges 52 are thus caused to be moved past the finishing rollers 36 as said rollers are maintained in resilient engagement therewith. Equal pressure is maintained on each of the edges 52 as relief valves 63 permit said finishing rollers to follow the contour of each of said edges. When the carriage 13 has reached its upper position, switch 58 may be moved to its downward position to cause arms 37 and finishing rollers 36 to be returned to their upright, inactive position, in the manner above described.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. Apparatus for finishing the edges of a glass sheet or the like, comprising a carriage, support means on said carriage for supporting a glass sheet with a pair of opposite edges projecting outwardly therefrom, pressure responsive means for moving said support means and glass sheet from a first to a second position, finishing elements movably mounted on opposite sides of the path of movement of the glass sheet edges, pressure responsive means operably connected to said finishing elements to move said elements from a first position out of the path of movement of the glass sheet to a second position in the path of movement of the outwardly projecting edges of the glass sheet, pressure supply lines interconnecting each of said pressure responsive means, and valve means in said pressure supply lines and operable during movement of the glass sheet from the first to the second position for limiting the pressure exerted by the pressure responsive means operatively connected to the finishing elements.

2. A method of finishing the edge of a glass sheet having two opposed non-parallel edges, comprising supporting the sheet intermediate the non-parallel edges and with said edges angling upwardly toward one another and forming the side edges of said sheet, engaging said edges of the sheet with finishing elements mounted for movement toward and away from one another in the plane of movement of the glass sheet, applying pressure to each of said finishing elements to maintain said elements in contact with the non-parallel sheet edges, moving said sheet upwardly against the action of a pair of said finishing elements positioned to engage said edges and being resiliently urged inwardly and downwardly relative to the path of travel of said sheet, and maintaining the pressure applied to said finishing elements at a value less than that required to move the glass sheet between said elements whereby the finishing elements follow the contour of the non-parallel sheet edges.

References Cited in the file of this patent

UNITED STATES PATENTS

| 1,505,867 | Cote | Aug. 19, 1924 |
| 1,727,863 | Clifford | Sept. 10, 1929 |
| 1,876,178 | Teschel et al. | Sept. 6, 1932 |
| 1,919,639 | Myers | July 25, 1933 |
| 2,022,530 | White | Nov. 26, 1935 |
| 2,120,570 | Pearne et al. | June 14, 1938 |
| 2,180,570 | Walper | Nov. 21, 1939 |
| 2,513,799 | Heldenbrand | July 4, 1950 |
| 2,581,157 | Whitcomb | Jan. 1, 1952 |